United States Patent [19]

Ridgway

[11] Patent Number: 4,473,942
[45] Date of Patent: Oct. 2, 1984

[54] PRECISION CLEAVING OF OPTICAL FIBERS

[75] Inventor: David N. Ridgway, Decatur, Ga.

[73] Assignee: AT&T Bell Laboratories, Murray Hill, N.J.

[21] Appl. No.: 370,369

[22] Filed: Apr. 21, 1982

[51] Int. Cl.³ .............................................. C03B 37/16
[52] U.S. Cl. .................................. 29/869; 225/2; 225/96.5; 225/101
[58] Field of Search ............... 225/2, 96.5, 101; 65/2, 65/10.2; 29/869, 868

[56] References Cited

U.S. PATENT DOCUMENTS

| | | | |
|---|---|---|---|
| 3,934,773 | 1/1976 | Chinnock et al. | 225/2 |
| 4,039,309 | 8/1977 | Albanese et al. | 65/2 |
| 4,046,298 | 9/1977 | Schroeder, Jr. | 156/344 |
| 4,146,301 | 3/1979 | Cherin et al. | 350/96.21 |
| 4,202,475 | 5/1980 | Hirai et al. | 225/2 |
| 4,216,004 | 8/1980 | Brehm et al. | 65/2 |

OTHER PUBLICATIONS

Optical Fiber End Preparation for Low-Loss Splices, D. Gloge et al., The Bell System Technical Journal, vol. 52, No. 9, Nov. 1973, pp. 1579-1588.
Fibers Simple Testing Methods Give Users a Feel for Cable Parameters, R. B. Chesler et al., Electronics, Aug. 5, 1976, pp. 90-92.
Torsion Effects on Fractured Fiber Ends, M. J. Saunders, Applied Optics, vol. 18, No. 10, May 15, 1979, pp. 1480-1481.
Fiber-Break Testing by Interferometry: A Comparison of Two Breaking Methods, K. S. Gordon et al., Applied Optics, vol. 16, No. 4, Apr. 1977, pp. 818-819.
T & B Optoelectronics Product Literature, Fiber Optic-Cleaving Tool for Glass Optical Fibers, Thomas & Betts Corporation, 1980, New Jersey (1 sheet).
L. C. Mandigo, *IBM Corp.*, Fiber-Optic Cutting Tool, p. 1787, (1979).
A. H. Cherin and P. J. Rich, *The Bell System Technical Journal*, vol. 55, No. 8, (1976), pp. 1057-1067, An Injection-Molded Plastic Connector for Splicing Optical Cables.

Primary Examiner—Frank T. Yost
Attorney, Agent, or Firm—James H. Fox

[57] ABSTRACT

Optical fibers are cleaved with high precision by a technique that yields flat endfaces that are perpendicular to the axis of the fiber within 1 degree, and typically within 0.5 degree. This is very advantageous for obtaining low loss splices of fibers, especially single mode fibers. In the present technique, a fiber is secured in two linearly aligned chucks in a sequence that allows one end to rotate unconstrained to minimize tortion. An axial tension is then applied in the fiber, which is next scored. The fiber then typically breaks, but cleaving can be promoted by applying further tension, or introducing moisture, if necessary.

9 Claims, 4 Drawing Figures

PRECISION CLEAVING OF OPTICAL FIBERS

BACKGROUND OF THE INVENTION

1. Field of the Invention

This invention relates to a method of cleaving optical fibers, and fibers joined after preparation thereby.

2. Description of the Prior Art

Optical fibers are prepared prior to splicing to another fiber, or joining to a terminating device, by cleaving the fiber to obtain a high-quality endface. In order to obtain low optical losses, the endface of the fiber must be substantially flat and without flaws. One technique for cleaving optical fibers is described in "Optical Fiber End Preparation for Low Loss Splices," by D. Gloge et al, *Bell System Technical Journal*, Vol. 52, page 1579 (1973). In that technique, a fiber is clamped into position, and a curved form is pressed against the fiber to obtain a curvature. A scoring blade is next passed over the curved fiber. The fiber then typically breaks in such a way as to produce a flat endface; see also U.S. Pat. No. 3,934,773, coassigned with the present invention. In other cleaving methods, a fiber is inserted in a tool, and a scribing wheel is turned to score the fiber substantially around its circumference. A slight tension then results in a break of the fiber. Another technique for cleaving fibers is to manually grasp a section of bare fiber and scribe it across a hard edge, and thereafter pull it straight in order to snap the fiber at the scratch; see "Fibers—Simple Testing Methods Give Users a Feel for Cable Parameters," by R. B. Chesler and F. W. Dabby in *Electronics*, pages 90–92, Aug. 5, 1976.

In addition to endface quality, one parameter of importance is the angle of the endface to the axis of the fiber. It is desirable that the plane of the endface be normal to the fiber axis, with the "fracture angle" measuring deviation from the normal. It has been found that tortion adversely affects the fracture angle when cleaving a fiber; see "Tortion Effects on Fractured Fiber Ends," by M. J. Saunders, *Applied Optics*, Vol. 80, page 1480 (1979). The method for measuring or reducing tortion given therein was to hang a portion of the fiber vertically with a weight until it achieved a neutral position. For measuring the effects of tortion, a scored fiber was rotated a certain amount, a tension applied, and the resulting fracture angle measured.

With the advent of single mode optical fibers, the quality of the splice between fibers is especially important. This is because single mode optical fibers can have a very low loss; for example, on the order of 0.3 to 0.5 db/km for radiation having a wavelength of about 1.3 or 1.55 micrometers. It is evident that even very low values of additional loss introduced by splices will significantly limit the spacing between repeaters in such low loss fibers. For example, if a splice is placed on average every kilometer in a fiber that has an inherent loss of 0.4 db/km, and if the splice itself adds an additional 0.2 db loss, the average loss of the spliced fiber will be 0.6 db/km. However, if the splice loss were reduced to 0.1 db, the average loss of the spliced fiber would be 0.5 db/km. For a typical single mode optical fiber system operating in a wavelength range of about 1.3 to 1.55 micrometers, this reduction in loss is estimated to yield an increase in maximum repeater spacing of about 1 to 2 kilometers. Therefore, a very significant economic benefit is realized by reducing the splice loss between low loss fibers. For this reason, special attention must be paid to preparing the ends of optical fibers prior to splicing.

SUMMARY OF THE INVENTION

I have invented a method of cleaving an optical fiber whereby a fiber is placed in linear alignment means and secured along a first portion of its length. An end of the fiber is allowed to rotate unconstrained so that tortion is substantially minimized. A second portion of the fiber is then secured, and an axial tension applied to the fiber. The tensioned fiber is substantially straight between, and in alignment with, the first and second portions. The fiber is next scored at a point between the first and second portions where the coating of the fiber, if any, has been previously removed. The fiber then breaks of itself in some cases. In other cases, additional tension is applied, or moisture is introduced into the scored area of the fiber to promote cleavage of the fiber. The endfaces that result are substantially flat and typically perpendicular to the axis of the fiber to within 1 degree and frequently within ½ degree. Low loss fiber splices, typically by cement splicing or fusion splicing, can thereafter be achieved.

In the above Figures, the diameter of the optical fiber is shown enlarged from typical values for improved clarity.

DETAILED DESCRIPTION

Figure 1:
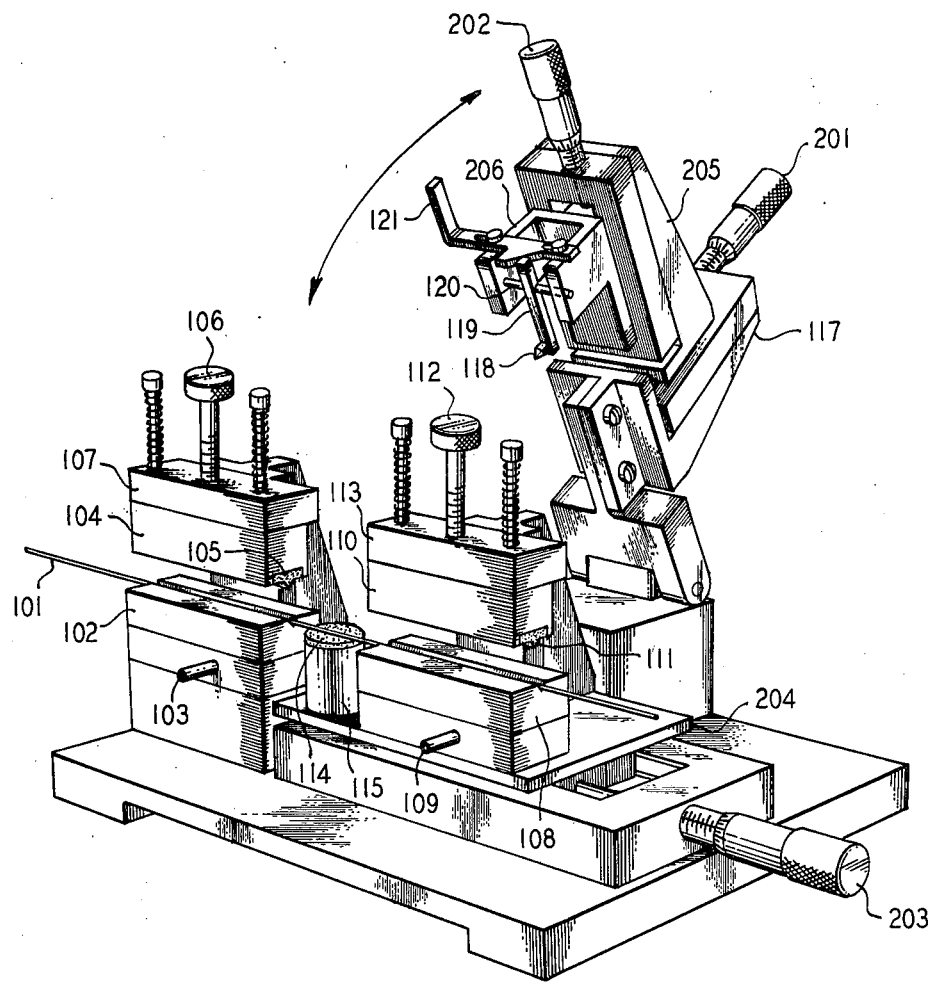
FIG. 1 shows an apparatus suitable for practicing the present invention and the component parts thereof.

The following description relates to a method of cleaving an optial fiber. An apparatus suitable for practicing the present invention is shown in FIG. 1 wherein an optical fiber 101 is placed in chucks 102 and 108 having V-shaped grooves running axially therethrough. The grooved chucks serve in part to obtain a linear alignment of the fiber portion therein. The V-grooves are themselves conveniently aligned prior to operation with the use of parallel bars placed on the outside of chucks 102 and 108, or by the use of a straight rod placed in the V-grooves. I recommend a maximum deviation from linearity of the V-grooves of less than 1 degree in any plane. A first securing means for securing a first portion of the fiber comprises clamp 104 having compliant member 105 attached thereto, stationary threaded plate 107, and clamp adjusting screw 106. A second securing means comprises clamp 110, compliant member 111, stationary threaded plate 113, and screw 112. I have found that neoprene rubber having a durometer rating of about 60 is suitable for the compliant members 105 and 111. The fiber passes across stage 115 and compliant layer 114 between the first and second chucks. The height of stage 115 is such that when the fiber is secured in the V-grooves, the fiber lies flat on layer 114, with substantially no bending of the fiber between the chucks.

Pivot arm 117, which comprises the scoring means, is shown in the raised position. Scoring needle 118 is attached to lever 119 which pivots on pin 120, having a rest position that is determined by member 121. A satisfactory scoring needle is a phonograph stylus diamond having a 5 micrometer wide tip and a body angle of 60 degrees. A scoring needle force of about 1.5 grams has been found suitable for cleaving a silica fiber having an outer (cladding) diameter of 125 micrometers.

The operation of the device will now be illustrated. If the fiber is coated, the portion to be scored is bared of coating. For a silica fiber coated with an epoxy acrylate, I find that methylene chloride solution is a satisfactory coating solvent, with others known in the art for various coating materials. The fiber 101 is placed into the V-groove of the chucks so that at least one end of the fiber is sufficiently close to a chuck so that allowing the fiber to remain unconstrained substantially reduces tortion in the fiber. In addition, minimizing the fiber overhang on one end minimizes bending of the fiber when secured in the chucks. I recommend that one end of the fiber overhang no more than about 4 inches off the end of the chuck for these purposes.

Assuming that the short end of the fiber extends to the right of alignment means 108 as viewed, a vacuum is next applied first to the V-groove in chuck 102 through port 103. The vacuum port communicates with a slot in the bottom of the V-groove. This vacuum holds the fiber in the V-groove for convenience of performing the following operation, but is not necessary for the successful operation of the device. Screw 106 is next turned to lower members 104 and 105 onto a first portion of the fiber, so that compliant member 105 presses the fiber into the V-groove. (The fiber coating should be left on the portion to be thus secured to minimize the possibility of damage to the fiber.) Since the right-hand side of the fiber is still free to rotate, any tortion is substantially removed by rotation of the free end. Then, a vacuum is applied through port 109 to a similar slot at the bottom of the V-groove in chuck 108, which pulls the fiber down into the groove while adding minimal tortion to the fiber. Next, the right-hand screw 112 is turned to lower member 110, thereby pressing member 111 onto the fiber. The V-groove geometry, as well as the shape and compliance of member 111, allow the fiber to be securely clamped while adding minimal tortion. (The fracture angles subsequently achieved indicate that a tortion of less than 1 degree/cm is typically achieved, as estimated from the data given by the Saunders article noted above.)

Figure 2:
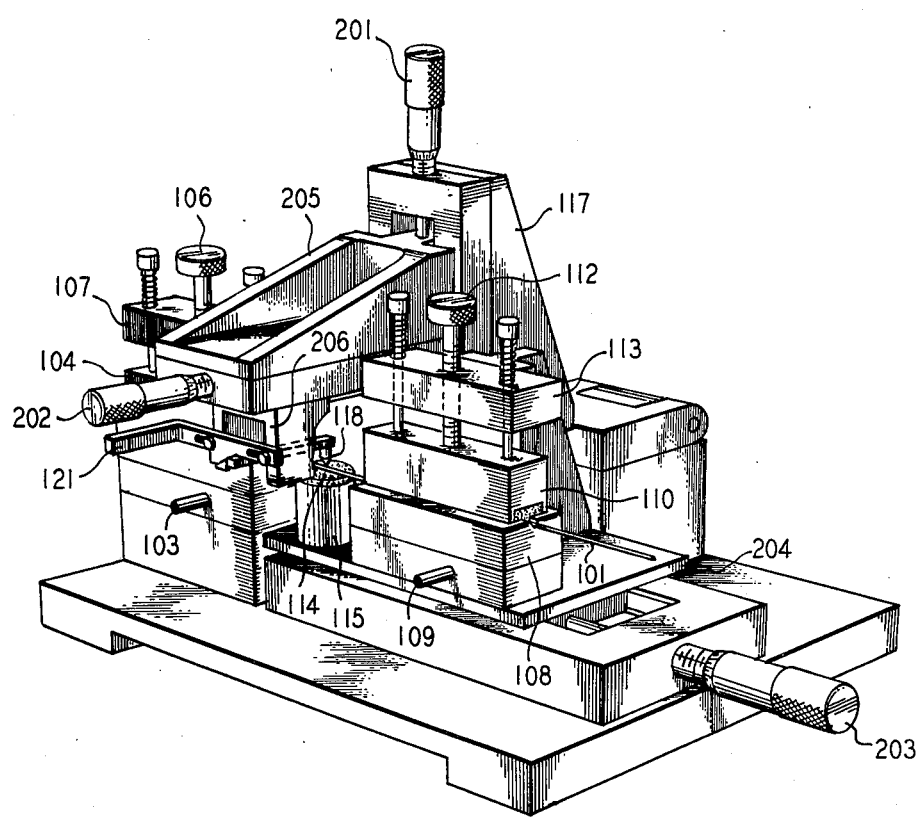
FIG. 2 shows the apparatus in position to tension and score an optical fiber.
Figure 3:
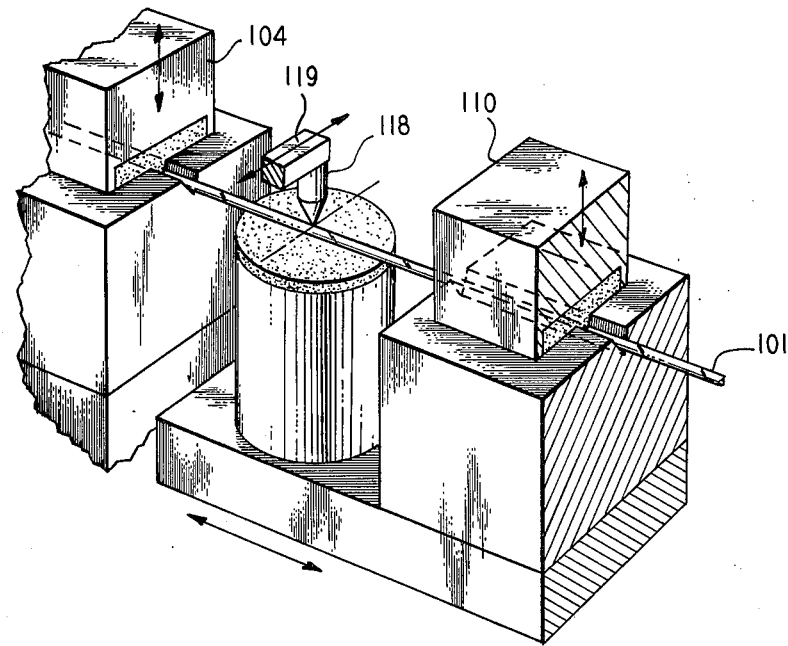
FIGS. 3 and 4 show the operation of scoring an optical fiber, and subsequent cleavage of the fiber.

Referring to FIG. 2, the arm 117 is next rotated so as to position scoring member 118 to one side of the fiber. The rest position of member 118 is adjusted so that the scoring member is about ¼ of a fiber diameter below the top surface of the fiber. The vertical position of member 118 is adjusted by micropositioner screw 201, which adjusts the position of sliding stage 205 on arm 117. The fiber is next tensioned by adjusting micropositioning screw 203 which moves stage 204 on which chuck 108 is fastened. The fiber is substantially straight (unbent) between chucks 102 and 108, so that the tension is substantially uniform across the diameter of the fiber. Stretching the fiber by moving the stage 204 about 5.5 mils has been found satisfactory for a silica optical fiber having an outside diameter of approximately 125 micrometers. Next, micropositioning screw 202 is used to move sliding stage 206 in relation to member 205. This moves scoring needle 118 at right angles to the axis of the fiber, and thereby draws the scoring needle 118 over a portion of the surface of the fiber; see FIG. 3. This results in scoring the fiber; that is, producing a small scratch at the point of contact between needle 118 and the fiber.

Figure 4:
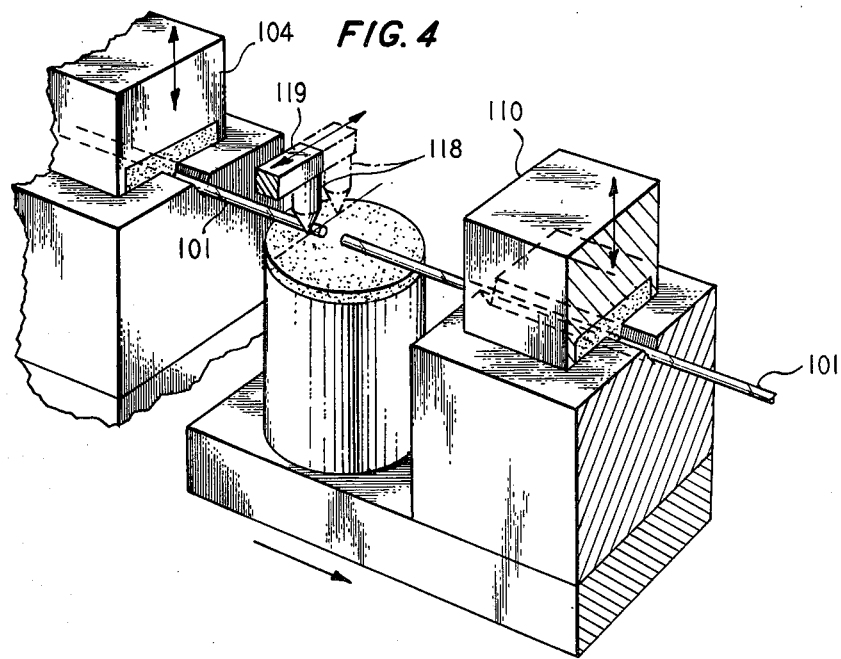

After scoring, the fiber in some cases cleaves of its own accord, due to the tension previously applied; see FIG. 4. In other cases, additional tension is applied by micropositioner screw 203 to encourage the fiber to break. This can also be accomplished in many cases by providing moisture in the vicinity of the scratch on the fiber. I have found that simply breathing on the fiber induces cleavage in many cases. This is appparently due to water molecules entering the scratch and rapidly propagating it through the fiber.

Fibers cleaved according to this technique have been found to yield endfaces that are substantially flat and perpendicular to the axis of the fiber. In a test in which 136 fibers were cleaved, the fracture angle was less than 1 degree in approximately 99 percentage of the cases, and less than ½ degree in approximately 79 percentage of the cases. It appears that these very advantageous results are due to: (1) low tortion in the fiber; (2) the tension in the fiber during scoring; and (3) the absence of bending in the tensioned portion of the fiber during the propagating of the scratch through the fiber. In addition, the sequence of operations shown above is significant for obtaining these desired conditions.

The present technique is advantageous for preparing fibers to be joined by means of connectors or splices. It has been found that when the cement splicing technique is used, losses in single mode optical fibers having a core diameter of approximately 8 to 9 micrometers have averaged less than 0.1 db. While losses in fused fibers are typically higher than those of cemented splices due to core deformation and misalignment due to surface tension effects, cleaving the fiber according to this technique is also advantageous prior to fusion splicing. It can be seen that with the significant economic advantages obtained with low loss splices, the value of the present technique in many cases resides primarily in the reduced overall costs of an optical fiber system.

While the foregoing embodiment has been shown in terms of cleaving a single fiber, it is apparent that it can be extended to cleaving multiple fibers, as by providing multiple V-grooves that allow cleaving device 118 to scratch several fibers in one pass. While the clamping members shown herein have been found to be very useful in maintaining a high degree of linear alignment while allowing tortion effects to be relieved when practiced according to the present technique, it can be seen that other means for securing the fibers can be utilized according to the principles of the present invention. All such variations and deviations utilizing the teachings through which the present invention has advanced the art are considered to be within the spirit and scope of the present invention.

What is claimed is:

1. A method of cleaving an optical fiber characterized by securing a first portion of said fiber to a first linear alignment means;

allowing an end of the fiber to rotate freely, thereby minimizing the tortion of the fiber at least between said first portion and said end;

securing a second portion of said fiber that is between said first portion and said end to a second linear alignment means by steps comprising placing said fiber in a groove, applying a vacuum so as to pull said fiber down to the bottom of said groove, and pressing said fiber into said groove by means of a compliant member;

applying a tension to said fiber between said first and second portions, with said fibers being substantially straight between, and in alignment with, said first and second portions;

and scratching the surface of said fiber substantially perpendicularly to the axis of said fiber at a point between said first and second portions;

with the scratch thereby formed on the surface of said fiber thereafter propagating through said fiber.

2. The method of claim 1 whereby the propagating of said scratch is promoted by increasing the tension on said fiber following said scoring.

3. The method of claim 1 whereby the propagating of said scratch is promoted by providing moisture in the vicinity of said scratch.

4. The method of claim 1 whereby the endface resulting from said operation is perpendicular to the axis of said fiber to within 1 degree.

5. A method of joining first and second optical fiber segments by steps comprising cleaving at least one end of each of said segments, and thereafter joining a cleaved end of said first segment to a cleaved end of said second segment, characterized in that said cleaving is accomplished by steps comprising;

securing a first portion of said fiber to a first linear alignment means;

allowing an end of the fiber to rotate freely, thereby minimizing the tortion of the fiber at least between said first portion and said end;

securing a second portion of said fiber that is between said first portion and said end to a second linear alignment means by steps comprising placing said fiber in a groove, applying a vacuum so as to pull said fiber down to the bottom of said groove, and pressing said fiber into said groove by means of a compliant member;

applying a tension to said fiber between said first and second portions, with said fibers being substantially straight between, and in alignment with, said first and second portions;

and scratching the surface of said fiber substantially perpendicularly to the axis of said fiber at a point between said first and second portions;

with the scratch thereby formed on the surface of said fiber thereafter propagating through said fiber.

6. The method of claim 5 wherein said joining is further accomplished by means of a connector.

7. The method of claim 5 wherein said joining is further accomplished by means of a splice.

8. A method of joining an optical fiber to a terminating device by steps comprising cleaving at least one end of said fiber and thereafter joining a cleaved end of said fiber to said device characterized in that said cleaving is accomplished by steps comprising;

securing a first portion of said fiber to a first linear alignment means;

allowing an end of the fiber to rotate freely, thereby minimizing the tortion of the fiber at least between said first portion and said end;

securing a second portion of said fiber that is between said first portion and said end to a second linear alignment means by steps comprising placing said fiber in a groove, applying a vacuum so as to pull said fiber down to the bottom of said groove, and pressing said fiber into said groove by means of a compliant member;

applying a tension to said fiber between said first and second portions, with said fibers being substantially straight between, and in alignment with, said first and second portions;

and scratching the surface of said fiber substantially perpendicularly to the axis of said fiber at a point between said first and second portions;

with the scratch thereby formed on the surface of said fiber thereafter propagating through said fiber.

9. An apparatus for cleaving one or more optical fibers characterized by first and second linear alignment means having one or more linear grooves therein, with the one or more grooves in said first alignment means being substantially linearly aligned with the corresponding one or more grooves in said second alignment means;

means for securing one or more fibers placed in said grooves, with at least one of said means comprising: a passageway adapted for communicating with a source of vacuum, and further adapted for pulling fibers downward into said grooves upon application of a vacuum, and a compliant member adapted to pressing said one or more fibers into said one or more grooves;

means for supporting said one or more fibers between said first and second alignment means so that said one or more fibers are substantially straight between said first and second alignment means;

means for lineraly moving at least one of said alignment means so as to produce an axial tension in said one or more fibers secured therein;

and means for scoring said one or more fibers.

* * * * *